United States Patent [19]

Mine et al.

[11] Patent Number: 4,874,980
[45] Date of Patent: Oct. 17, 1989

[54] LAMINATED MECHANICAL AMPLIFICATION MECHANISM FOR PIEZOELECTRIC ELEMENTS

[75] Inventors: Kazuhiro Mine; Kei Sanada, both of Tokyo; Mitsuteru Ide, Hyogo, all of Japan

[73] Assignee: NEC Corporation, Tokyo, Japan

[21] Appl. No.: 286,245

[22] Filed: Dec. 19, 1988

[30] Foreign Application Priority Data

Dec. 17, 1987 [JP] Japan ................................. 62-320352

[51] Int. Cl.$^4$ ............................................. H01L 41/08
[52] U.S. Cl. .................................................... 310/328
[58] Field of Search ........................ 310/328; 400/124; 101/93.05, 93.04

[56] References Cited

U.S. PATENT DOCUMENTS

| | | | |
|---|---|---|---|
| 4,435,666 | 3/1984 | Fukui et al. | 310/328 |
| 4,547,086 | 10/1985 | Matsumoto et al. | 310/328 X |
| 4,675,568 | 6/1987 | Uchikawa et al. | 310/328 |

Primary Examiner—Mark O. Budd
Attorney, Agent, or Firm—Burns, Doane, Swecker & Mathis

[57] ABSTRACT

In a mechanical amplification mechanism for piezoelectric elements, a pair of lever arms, base block and a pair of fulcrum portions connecting therebetween are structured with a lamination of thin metal plates of a predetermined number. Each of thin metal plate has the thickness smaller than the width of the fulcrum portions and they are laminated such that the total thickness is larger than the width of the fulcrum portions. The lamination strength of thin metal sheets is improved by either caulking predetermined positions or inserting a bonding material between every thin metal plates.

5 Claims, 7 Drawing Sheets

LAMINATED MECHANICAL AMPLIFICATION MECHANISM FOR PIEZOELECTRIC ELEMENTS

BACKGROUND OF THE INVENTION

This invention relates to a mechanical amplification mechanism for a piezoelectric element, and more particularly to a lever arm structure thereof.

In the U.S. Pat. No. 4,675,568 issued on Jan. 23, 1987, there is proposed a mechanical amplification mechanism for electromechanical transducer to be used for dot impact printers.

Figure 1A:
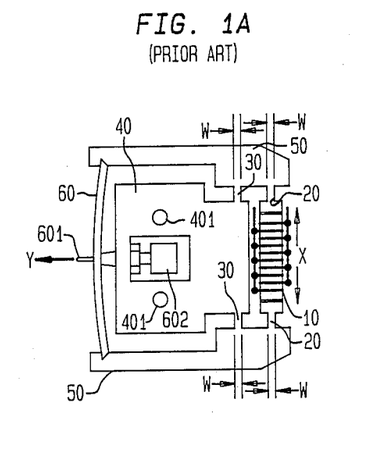
FIG. 1A is a front view of a prior art mechanical amplification mechanism.
Figure 1B:
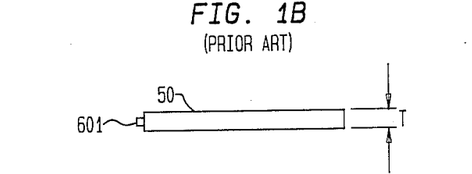
FIG. 1B is a side view thereof.

In the prior art as shown in FIG. 1A and FIG. 1B, a pair of lever arms 50 are respectively connected to both end faces of a piezoelectric element 10 and of a base block 40 through bottle necked holding portions 20 and fulcrum portions 30. The lever arms 50 hold a beam 60 in a sandwiching fashion at their opposite ends of the holding portions 20. The beam 60 had a printing needle 601 which is an acting element. The base block 40 is provided with a pair of attachment holes 41 and an adjustment screw 602 to be used for a backstop of the beam 60.

The mechanical amplification mechanism is required to maximize the energy conversion efficiency at the position of the printing needle 601. Therefore, the lever arms 50, the holding portions 20, the fulcrum portions 30 and the base block 40 have been made of the same and highly rigid materials such as stainless steel and structured integrally so as to transmit the force generated by the piezoelectric element to the beam 60. In order to effectively transmit the displacement or generated force of the piezoelectric element 1, it is integrally made of highly rigit materials of a large plate thickness T. It is respectively formed to have the fulcrum portions 30 and the holding portions 20 having the width W smaller than the plate thickness T to have small flexural modules.

The plate thickness T which can be punched out by a press is usually limited to a dimension equivalent to the width of the fulcrum portions 30 and the holding portions 20 (T $\leq$ W). As the conventional mechanical amplification mechanism needs the plate thickness T which is larger than the width W, it is impossible to use the punching process although the method is optimal for mass-producing the mechanism with a high dimensional precision. The manufacturing method is therefore quite limited for lever arms 50. For instance, if a write-cut electric spark method is used for manufacture, it requires longer time and higher costs even though it is most suitable for small quantity productions. The lost wax casting process or powder metallurgy may be used for manufacture, but they impose restrictions in respect of dimensions and shapes. If these methods are used, voids are often generated at the time when the bottle necked portions 20 and 30 are being molded, thus deteriorating mechanical strength and dimensional precisions. The conventional mechanism thus has limitations for the manufacture and causes problems in price, dimensional precision and mechanical strength.

Moreover, as the bottle necked portions 20 and 30 are integrally formed of the same material, if a trivial flaw is caused in processing, stress becomes concentrated on the point to subsequently accelerate metalic fatigue and to shorten dynamic durability.

SUMMARY OF THE INVENTION

An object of the present invention is to solve the problems encountered in the prior art and to provide a mechanical amplification mechanism for piezoelectric elements having lever arms which can be manufactured by an ordinary press for mass production with high dimensional precision and which has longer durability even used at high speed.

According to the present invention, a mechanical amplification mechanism for a piezoelectric elements, is made of a laminated structure of a plurality of thin metal plates for the lever arms, the fulcrum portions, the holding portions and the base block. Each of the laminated thin metal plates has the thickness smaller than the width of the fulcrum portions. But the total thickness of the laminated structure at the fulcrum portions is larger than the width of the fulcrum portions.

DESCRIPTION OF THE PREFERRED EMBODIMENTS

Figure 2:
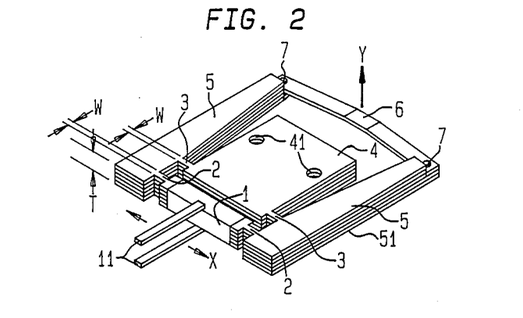
FIG. 2 is a perspective view to show the first embodiment of the mechanical amplification mechanism according to this invention.

Referring to FIG. 2, a pair of lever arms 5 are connected to a laminated base plates or a base block 4 via a pair of fulcrum portions 3, respectively. A piezoelectric element is sandwiched between the lever arms 5 via a pair of bottle-necked holding portions 2. The piezoelectric element 1 is formed by stacking a plurality of flat plates having a longitudinal displacement effect, such as titanate zirconate lead (PZT) and connected to the holding portions 2 with adhesives such as epoxy resin and other synthetic resin layers. Each of the holding portions 2 has a shape of a letter T. The lever arms 5 are made by laminating an arbitrary number of thin metal plates made by punching or etching highly rigid metal plates such as stainless steel or nickel/iron alloy of the thickness of 0.15 mm–0.5 mm. A beam 6 which works as an acting element is held at ends of the lever arms 5 with a clamping mechanical element such as flat head rivets 7. With the flat head rivets 7, thin metal plates 51 which are laminated are mechanically clamped on one side and fixed with synthetic resin which are used for attaching the piezoelectric element 1 on the other side to form lever arms 5 respectively. A beam 6 is manufactured of elastic metal material by punching process or the like.

In the mechanism thus structured, when electric voltage is applied on to a pair of terminal electrodes 11 of the piezoelectric element 1 to cause a displacement in a direction of X as shown in FIG. 2, the displacement X is transmitted to respective lever arms 5 via the fulcrum portions 2. The displacement is amplified at the tip ends of the lever arms 5. The beam 6 held between the lever arms 5 is displaced on both ends thereof to be deformed in the direction Y vertical to the displacement direction X according to the well known buckling theory, and the maximum displacement in the direction Y takes place at the center of the beam 6. When the applied voltage is removed, the piezoelectric element 1 returns to the original position, and the beam 6 also returns to the initial position.

A typical example of the embodiment is shown hereinafter. Stainless steel plate having 0.4 mm thickness and Young's modulus of $19.7 \times 10^3$ Kg/mm$^2$ is punched out by a press, and ten such pieces are laminated to achieve the thickness of 4 mm. When compared in performance, thus formed amplifying mechanism with a prior art integrally structured mechanism of the same material and thickness (4 mm), similar energy conversion efficiency (or the product of displacement and generated force) was obtained. As the mechanism is made by lamination of thin metal plates 51 of the thickness of 0.4 mm, the thickness is smaller than the width (0.7 mm) of the fulcrum portions 3 and the holding portions 2. They can be manufactured by the punching process without flaws to thereby achieve high mass-producibility as well as high dimensional precision. Unlike the prior art integrally molded structure made of the same material, even if there were caused trivial flaws at manufacturing, metallic fatigue would not extend to the whole portion of lever arms due to the laminated structure to thereby secure longer durability of the device.

Figure 3A:
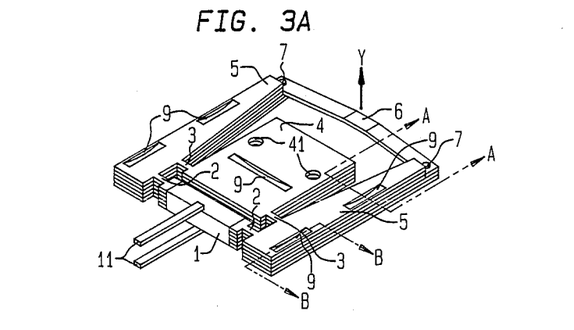
FIG. 3A shows a perspective view of the second embodiment of the mechanical amplification mechanism according to this invention, FIG. 3B an enlarged sectional view of FIG. 3A at the line A—A, and FIG. 3C an enlarged sectional view of FIG. 3A at the line B—B.
Figure 3B:
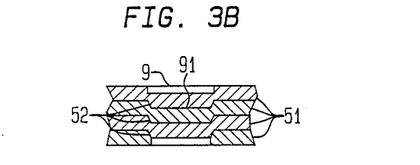
Figure 3C:
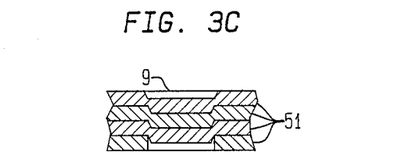

Referring to FIG. 3A in the second embodiment according to this invention, the thin metal plates 51 of the lever arms 5 described in relation to FIG. 2 are caulked at four places or caulking positions 9. As shown in FIGS. 3B and 3C, the bottom layer alone is locally perforated to have penetration holes, and subsequent layers thereon are either recessed to have blind holes or partially bored. The plates 51 are laminated one by one and caulked tightly in the square or round shape. The plates 51 are laminated tightly and fixedly with the frictional force on the sections 52 of projections 91 of the caulked positions 9 as shown in FIG. 3B. As each plate 51 is caulked tightly on projections 91, a firm and strong surface contact can be obtained to achieve longer durability and better reliability than the first embodiment.

As an example of the second embodiment, ten sheets of stainless steel of the thickness of 0.4 mm were piled to have a lamination in the outer dimension of 35 mm×30 mm×4 mm (thickness). Two caulking positions 9 are provided on each of the lever arms 5 and a square shaped one on the base block 4. When triangle waves of DC 0∼100 V (peak to peak) and 200 Hz were applied on the piezoelectric element 1, the dynamic durability in this embodiment was $10^8$ times or higher which is better than that of the first embodiment or $10^7$ times. As the projections 91 at caulking positions are used as the reference in lamination, there is no deviation caused. Further, as the sequential process of the press metal dies can be simplified, all the process can be automated, and the number of manufacturing steps reduced. The manufacture cost was reduced to less than one tenth of a prior art mechanical amplification mechanism of the same effect which was manufactured by the conventional process of wire cut electric sparking.

Figure 4A:
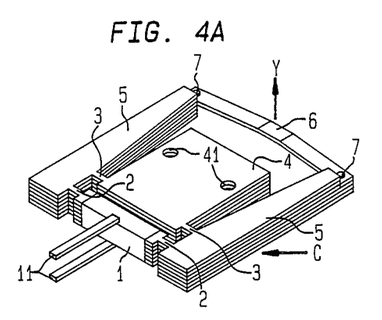
FIG. 4A is a perspective view to show the third embodiment of the mechanical amplification mechanism according to this invention, and FIG. 4B a partial enlargement to show the laminated portion marked with an arrow C in FIG. 4A.
Figure 4B:
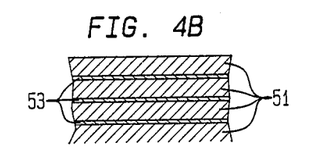

FIG. 4A shows the third embodiment of this invention, wherein the lever arms 5 of laminated thin metal plates 51 described in relation to the first embodiment are set and connected via interspace members comprising thermosetting resin adhesive 53 as shown in FIG. 4B. As the adhesives are dried in an oven in the drying step, it is necessary to clamp the piled plates as a whole with clamping jigs in advance. As each plate 51 is connected surface-to-surface with thermosetting adhesives 53, a high reliability and longer durability can be achieved.

As an example of this embodiment, ten plates of stainless steel of the thickness of 0.4 mm are piled and connected on surfaces with thermosetting adhesives 53 such as epoxy resin in a manner similar to the first example to have a lamination of 4 mm thickness. As a result, the rigidity of the lamination is improved, and frequency characteristics improved from 2,000 Hz to 2,400 Hz in primary resonance frequency. Similarly to the second embodiment, the dynamic durability was improved to $10^8$ times or higher.

Figure 5A:
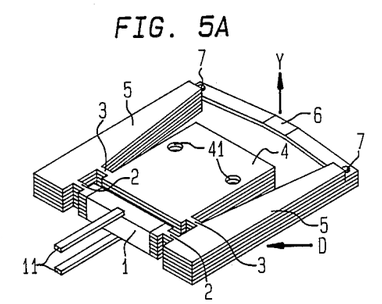
FIG. 5A is a perspective view to show the fourth embodiment of the mechanical amplification mechanism according to this invention, and FIG. 5B a partial enlargement of the laminated portion marked with an arrow mark D in FIG. 5A.

FIG. 5A shows the fourth embodiment. In this embodiment, the thin metal plates 51 of the lever arms 5 described in relation to the first embodiment are coated with metal film 54 by solder plating or silver plating before lamination. The lamination is subjected to melt-pressure welding by a press having a steam platen of high temperature (ca. 260° C.).

Figure 5B:
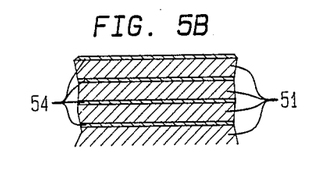

As a typical example of this embodiment, ten stainless steel plates of the thickness of 0.4 mm were coated with metal coating films 54 by solder plating, silver plating, etc. all over the surfaces, piled and laminated with melt-pressure welding in a manner similar to the first embodiment. When the sample was tested under the same conditions as the second typical example, durability as high as $10^8$ times or more was attained to prove its high resistance under severe conditions (vibration resistance, impact resistance, etc.). The frequency characteristic was 2,400 Hz similarly to the third example. As a beam 6 can be connected simultaneously when the plates are pressure welded, the step of rivet clamping is eliminated to conveniently reduce the number of assembly steps. Further, as the lever arms 5 can be manufactured with an automatic press method where thin metal plates are automatically plated in a shape of a hoop, they can be mass-produced to thereby reduce the production cost.

Figure 6A:
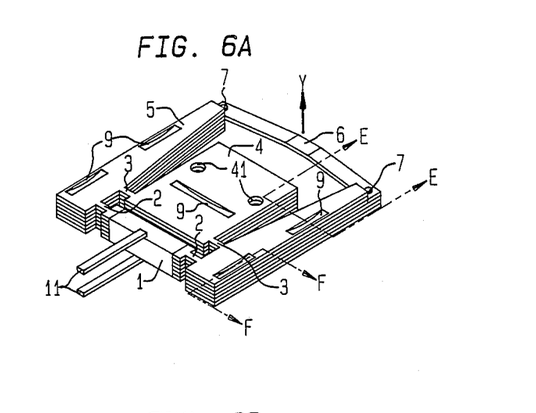
FIG. 6A is a perspective view to show the fifth embodiment of the mechanical amplification mechanism according to this invention, FIG. 6B an enlarged sectional view at E—E line in FIG. 6A, and FIG. 6C an enlarged sectional view at the line F—F in FIG. 6A.
Figure 6B:
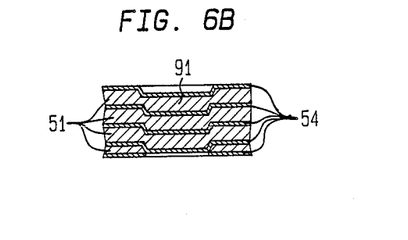
Figure 6C:
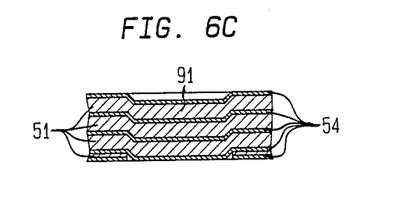

FIGS. 6A, 6B and 6C show the fifth embodiment of this invention. In this embodiment, the thin metal plates 51 of the lever arms 5 described in relation to the first embodiment are connected surface-to-surface by a combination of either thermosetting adhesives 53 or solder or silver plating to form interspace members of metal films 54 with contact bonding by friction on the surfaces 52 of the projections 91 at caulking positions 9.

Advantages of these two connecting methods are combined to have synergistic effect of the first to the fourth embodiments to achieve high durability of $10^9$ times as well as to improve frequency characteristics of 2,500 Hz or more. This embodiment can therefore withstand severer environment (resistance against vibration or impact).

As described in detail in the foregoing statement, the structure of this invention is highly suitable for means to block off laser beams or means for fine adjustment of the air valves.

Figure 7A:
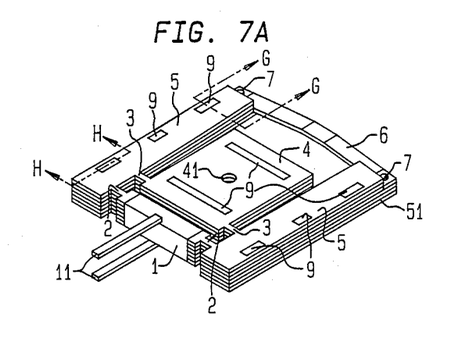
FIG. 7A is a perspective view to show the sixth embodiment of the mechanical amplification mechanism according to this invention, FIG. 7B an enlarged sectional view at the line G—G in FIG. 7A, and FIG. 7C an enlarged sectional view at the line H—H of FIG. 7A.
Figure 7B:
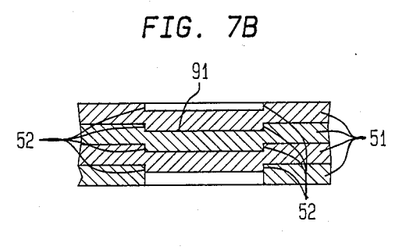
Figure 7C:
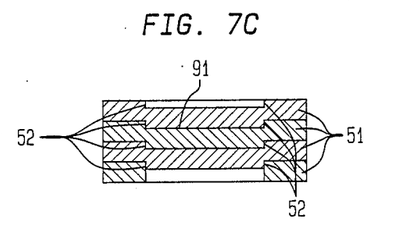

FIGS. 7A, 7B and 7C show the sixth embodiment which is similar to the one shown in FIG. 3 but different in respect of materials and shapes of caulking positions.

An embodiment was prepared by punching out 42 Ni~Fe plate having Young's modulus of $14.8 \times 10^3$ Kg/mm$^2$ and thickness of 0.4 mm. When they were processed, the lever arms 5 and a base block 4 were provided with caulking portions 9 in the number of 3 and 2 respectively which were partially or fully cut out in a square form. Ten such plates were piled to form a mechanical amplification mechanism of the size of 35 mm$\times$30 mm$\times$4 mm (thickness) which is wholly cut out in the bottom layer alone. In a displacement amplifying mechanism comprising such lamination, a piezoelectric element 1 and a beam 6 of stainless sheet (SUS 304), when triangle waves of DC 150 V (peak to peak) and frequency of 500 Hz was applied on the piezoelectric element 1, the dynamic durability was $10^8$ times or more. The production cost was reduced to one tenth or less of the similar amplification metal device manufactured by the prior art wire cut spark process.

Figure 8A:
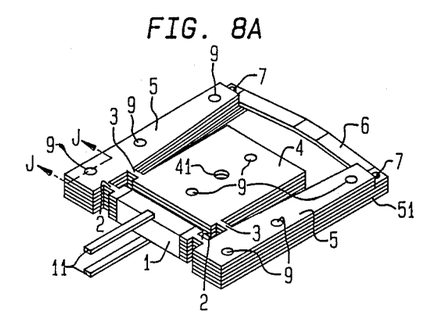
FIG. 8A is a perspective view to show the seventh embodiment of the mechanical amplification mechanism according to this invention, and FIG. 8B an enlarged sectional view at the line J—J of FIG. 8A.
Figure 8B:
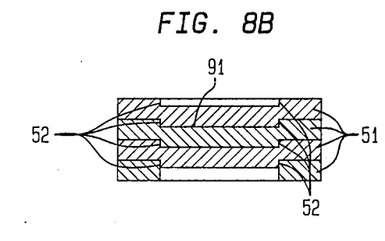

Referring now to FIGS. 8A and 8B, the seventh embodiment differs from the one shown in FIG. 7 in respect of the shape of caulking positions. More particularly, 42 Ni~Fe sheet having Young's mudulus of $14.8 \times 10^3$ Kg/mm$^2$ and the thickness of 0.4 mm was punched out by a press to prepare metal plates which have lever arms 5 and a base block 4 either wholly or partially cut out on the circumference thereof to form caulking positions 9. The number of the caulking positions was 3 and 2 respectively. Ten such plates were piled to form an amplification metal device of the size of 35 mm$\times$39 mm$\times$4 mm (thickness). A mechanical amplification mechanism comprising such lamination, a piezoelectric element 1 and a stainless steel sheet (SUS 304) attained the dynamic durability of $10^8$ times or higher when triangle waves of DC 150 V (peak to peak) and frequency of 500 Hz were applied on the piezoelectric element 1. The manufacturing cost was reduced to one tenth or less of the metal amplifying device manufactured by the prior art wire cut spark process to achieve the similar effect.

Figure 9:
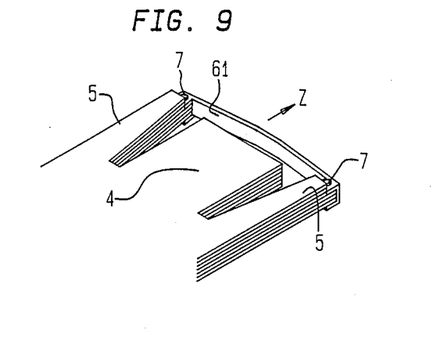
FIG. 9 is a perspective view to partially show the eighth embodiment of the mechanical amplification mechanism according to this invention.

Although the displacement direction Y of the beam 6 is vertical to the principal surface of the base block 4 in the foregoing statement, it is possible to structure the mechanism in a manner that a beam 61 is displaced in a direction of Z which extends along the longitudinal direction of the lever arms as shown in FIG. 9. The beam 61 may have a printing needle as shown in FIG. 1.

As described in detail, this invention can achieve the following effects because the two lever arms for transmitting and amplifying the displacement of a piezoelectric element have laminated structure, and connection or attachment of the mechanism is made by caulking connection, connection with synthetic resin adhesives, metal/melt welding or combination thereof:

(1) The mechanism can be manufactured by means of a press in automated process with higher dimensional precision and in complex shapes. Such a process is highly suitable for mass production to cut down the manufacturing costs.

(2) Mechanism may be shaped to have hollow, stepped or bottomed structures.

(3) As it can be made at arbitrary thickness and at higher rigidity, the mechanism can be adaptively produced to meet conditions in performance of various types of displacement and/or generated force.

(4) The mechanical amplification mechanism of this invention can achieve higher reliability with longer durability and at higher frequency characteristics than conventional integrally structured one made of the single material.

What is claimed is:

1. A mechanical amplification mechanism for piezoelectric elements comprising: a plurality of base plates laminated to each other, each of said base plates having a pair of fulcrum members protruding from opposite side edges thereof in a first direction, a pair of laminated lever arms respectively fixed to said fulcrum members such that each of said laminated lever arms is fixed to each of said fulcrum members, the longitudinal axes of each of said lever arms being disposed in a second direction which is perpendicular to said first direction, each of said lever arms having first and second portions with said fulcrum member serving as a positional boundary, said first portions being longer than said second portions, each of said base plates and each pair of said lever arms being formed from the same thin metal plate in an integrated form via said fulcrum members, a piezoelectric element fixed between the second portions of said lever arms, and a beam member fixed between the first portions of said lever arms.

2. The mechanical amplification mechanism for piezoelectric elements as claimed in claim 1, wherein the laminated plates of said base plates and lever arms are sticked to each other by caulking a predetermined positions thereof.

3. The mechanical amplification mechanism for piezoelectric elements as claimed in claim 1, wherein the laminated plates of said base plates and lever arms are sticked to each other by using interspace member of thermosetting adhesives.

4. The mechanical amplification mechanism for piezoelectric elements as claimed in claim 1, wherein the laminated plates of said base plates and lever arms are sticked to each other by using interspace member of metal coating films to be fused.

5. The mechanical amplification mechanism for piezoelectric elements as claimed in claim 2, wherein the laminated plates of said base plates and lever arms are sticked to each other by the interspace member of bonding material.

* * * * *